United States Patent [19]
Mills et al.

[11] Patent Number: 5,101,573
[45] Date of Patent: Apr. 7, 1992

[54] AUTOMOTIVE TESTING TOOL

[76] Inventors: Loren T. Mills, Rte. 1 Box 35G, Newcastle, Tex. 76372; William F. Moody, Rte. 1, Box 142, Graham, Tex. 76450

[21] Appl. No.: 751,184

[22] Filed: Aug. 28, 1991

[51] Int. Cl.⁵ .................................. G01D 21/00
[52] U.S. Cl. ........................... 33/600; 33/612; 269/6; 269/238; 269/287; 81/111
[58] Field of Search ............... 33/600, 612, 203; 269/3, 6, 165, 249, 238, 287; 81/111, 100, 110

[56] References Cited

U.S. PATENT DOCUMENTS

| | | | |
|---|---|---|---|
| 3,242,579 | 3/1966 | Cermanard et al. | 33/203 |
| 3,438,135 | 4/1969 | Bense | 33/600 |
| 3,438,646 | 4/1969 | Hannapel | 33/203 |
| 3,465,449 | 9/1969 | Wideburg et al. | 33/600 |
| 3,736,665 | 6/1973 | LaMoreux | 33/203 |
| 3,736,816 | 6/1973 | McAfee | 33/600 |
| 3,783,521 | 1/1974 | Schmidt | 33/612 |
| 3,909,889 | 10/1975 | Emerson | 269/238 |
| 4,176,830 | 12/1979 | Isley | 269/6 |
| 4,231,161 | 11/1980 | Belfiore | 29/271 |
| 4,744,135 | 5/1988 | Roels | 29/267 |

*Primary Examiner*—Thomas B. Will
*Attorney, Agent, or Firm*—Leon Gilden

[57] ABSTRACT

A tool arranged for the testing of automotive components, such as ball joints, is provided to include a handle pivotally mounted to an "L" shaped positioning leg. The positioning leg includes an upper cylinder mounted to the leg to receive a stud portion of a ball joint therethrough, with the lower cylindrical member defining a cup to receive a lowermost portion of a ball joint therewithin to permit pivotment of the "L" shaped leg relative to a handle pivotally mounted through the "L" shaped leg indicating deflection of a ball joint when the handle is pivoted relative to the "L" shaped leg. A modification of the invention includes magnetic insert members, each including parallel support legs to receive opposing ends of a shock absorber such as a gas-filled shock absorber to indicate resistance and deflection of the shock absorber in use.

4 Claims, 4 Drawing Sheets

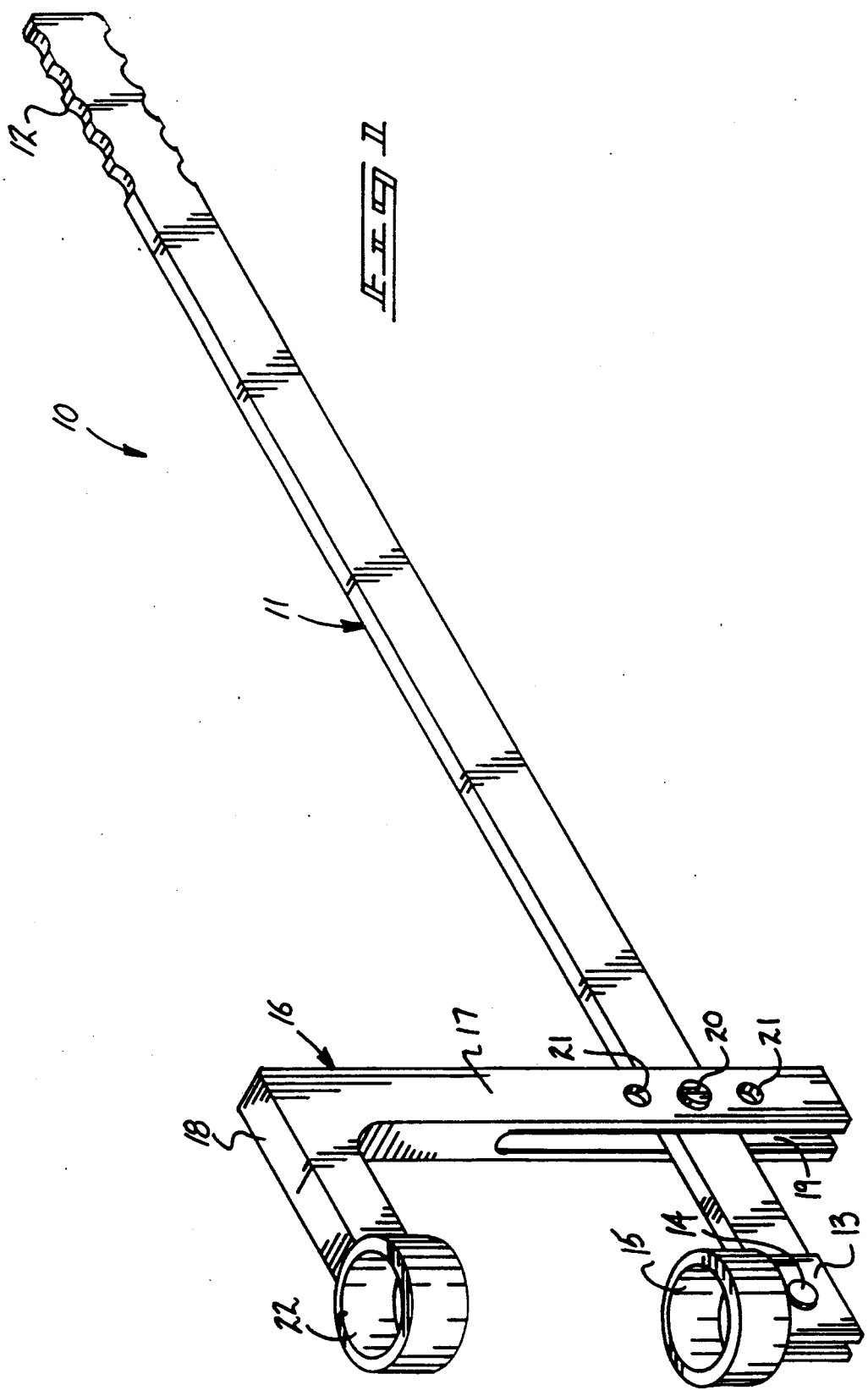

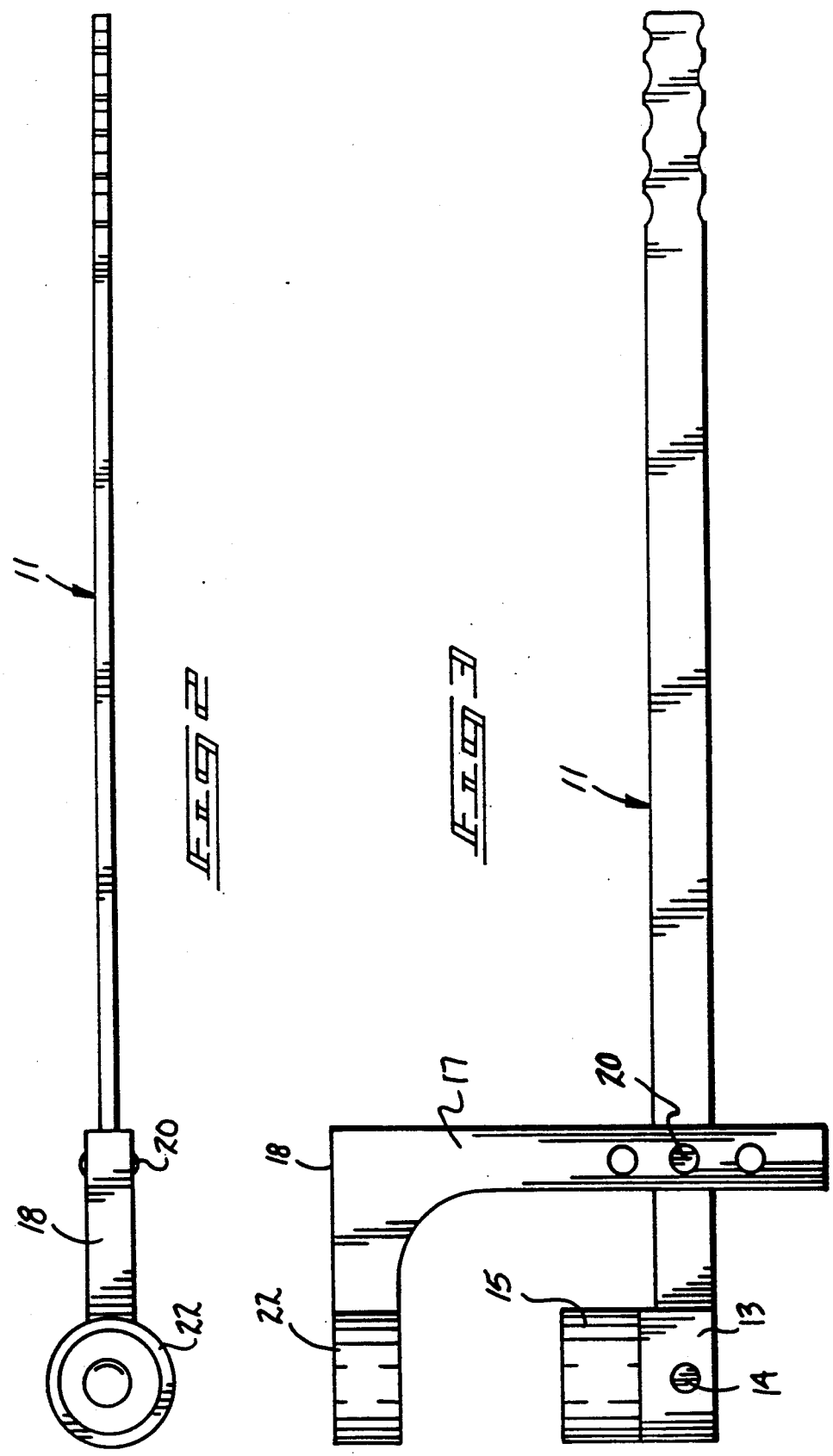

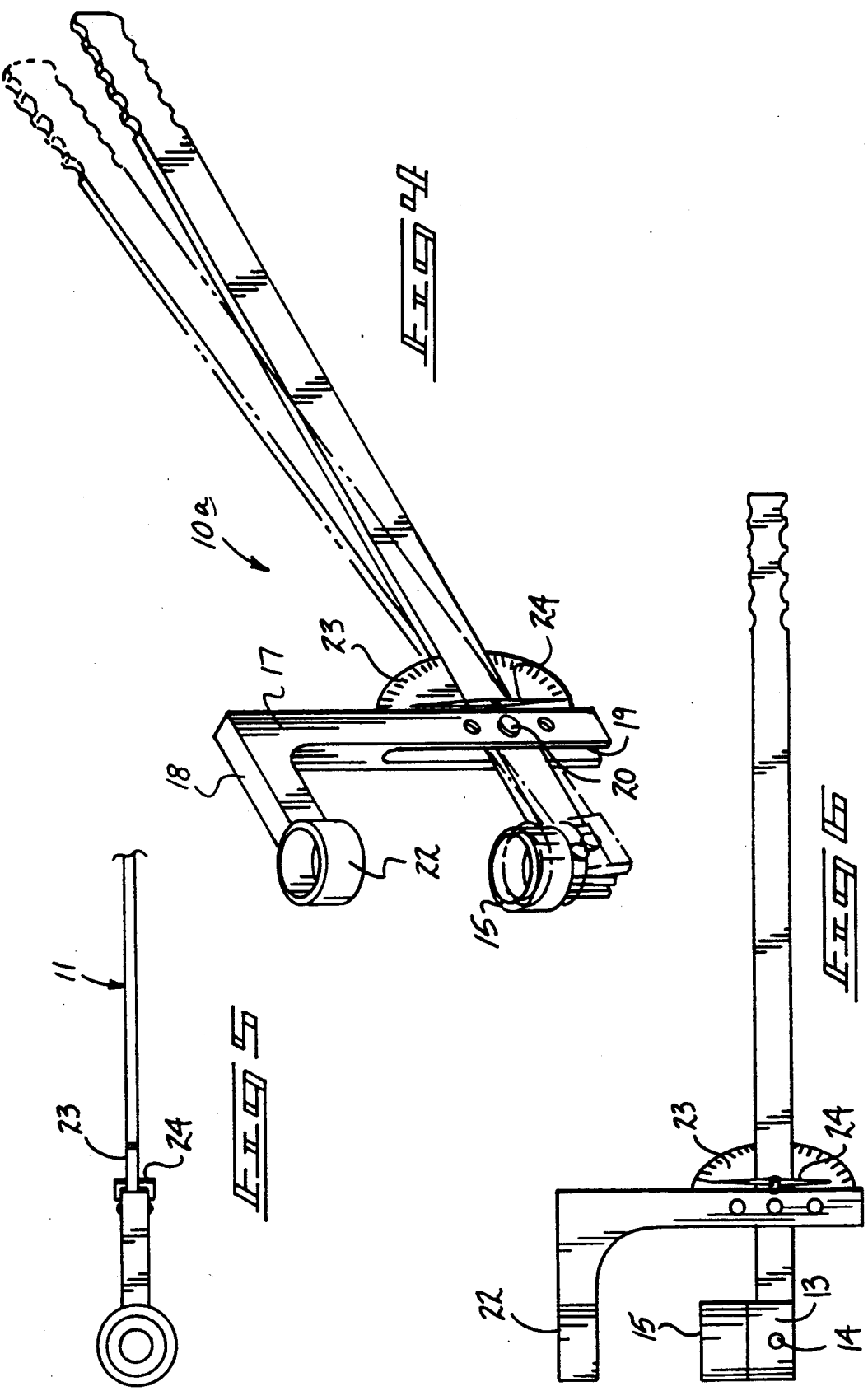

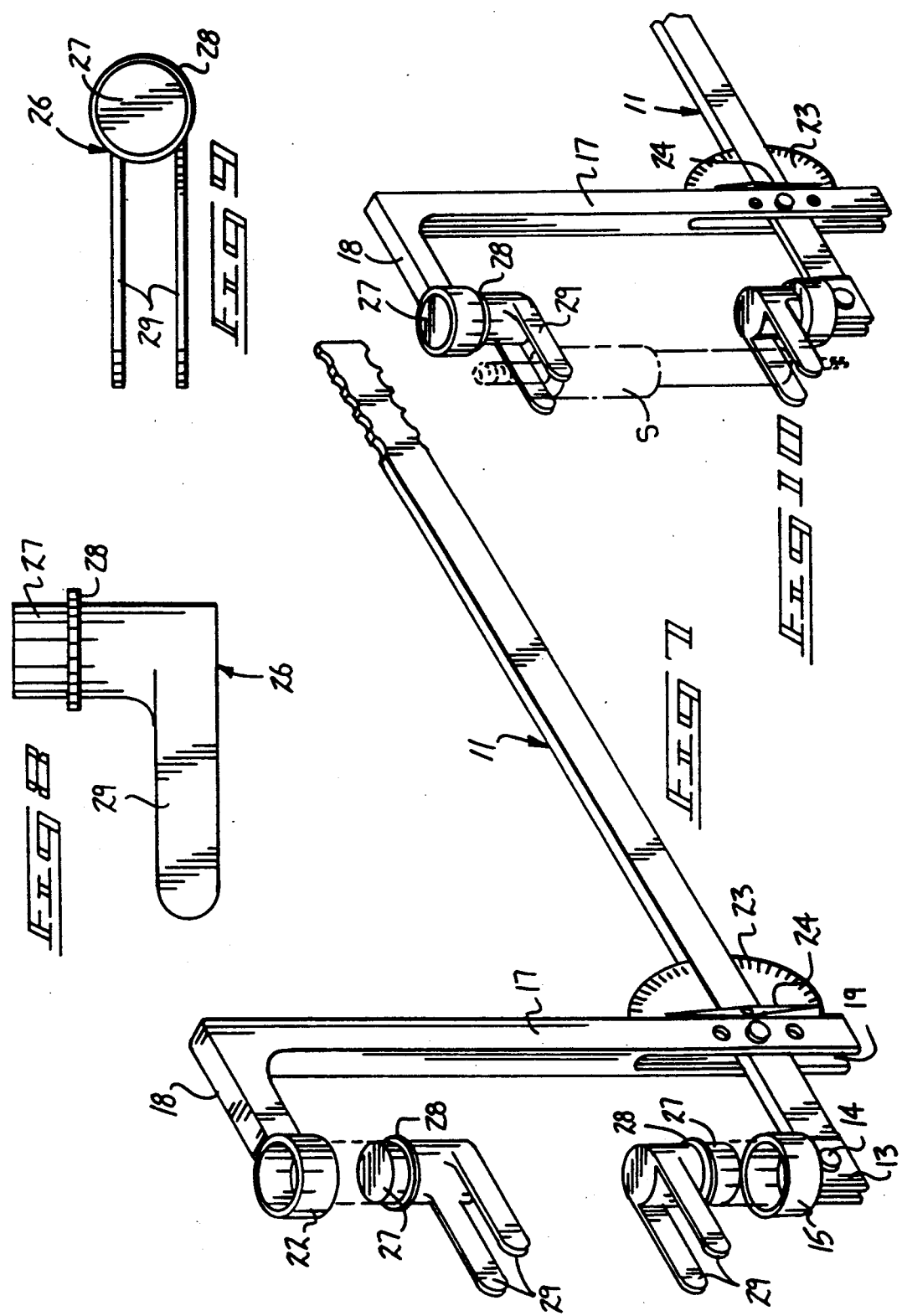

AUTOMOTIVE TESTING TOOL

BACKGROUND OF THE INVENTION

1. Field of the Invention

The field of invention relates to testing apparatus, and more particularly pertains to a new and improved automotive testing tool wherein the same is arranged for the deflection and testing of various automotive mechanical components.

2. Description of the Prior Art

Automotive testing tools of various types are utilized in the prior art. Such tools are typically addressed to specific components in an automotive environment. An automotive tool utilized in the prior art is exemplified in U.S. Pat. No. 4,231,161 to Belfiore utilizing an alignment tool to align pulleys of a belt drive system in three planes.

U.S. Pat. No. 4,744,135 to Roels sets forth an alignment tool for use in aligning a vehicle door relative to the vehicle.

Accordingly, it may be appreciated that there continues to be a need for a new and improved automotive testing tool as set forth by the instant invention which addresses both the problems of ease of use as well as effectiveness in construction in providing a tool to measure available deflection in a ball joint or shock absorber and to measure such testing for subsequent replacement as required of the ball joint and the like.

SUMMARY OF THE INVENTION

In view of the foregoing disadvantages inherent in the known types of testing apparatus now present in the prior art, the present invention provides an automotive testing tool wherein the same is arranged to receive a ball joint between opposed end portions of the tool permitting measurement of deflection of the automotive component. As such, the general purpose of the present invention, which will be described subsequently in greater detail, is to provide a new and improved automotive testing tool which has all the advantages of the prior art testing apparatus and none of the disadvantages.

To attain this, the present invention provides a tool arranged for the testing of automotive components, such as ball joints, provided to include a handle pivotally mounted to an "L" shaped positioning leg. The positioning leg includes an upper cylinder mounted to the leg to receive a stud portion of a ball joint therethrough, with the lower cylindrical member defining a cup to receive a lowermost portion of a ball joint therewithin to permit pivotment of the "L" shaped leg relative to a handle pivotally mounted through the "L" shaped leg indicating deflection of a ball joint when the handle is pivoted relative to the "L" shaped leg. A modification of the invention includes magnetic insert members, each including parallel support legs to receive opposing ends of a shock absorber such as a gas-filled shock absorber to indicate resistance and deflection of the shock absorber in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automotive testing tool which has all the advantages of the prior art testing apparatus and none of the disadvantages.

It is another object of the present invention to provide a new and improved automotive testing tool which may be easily and efficiently manufactured and marketed.

It is a further object of the present invention to provide a new and improved automotive testing tool which is of a durable and reliable construction.

An even further object of the present invention is to provide a new and improved automotive testing tool which is susceptible of a low cost of manufacture with regard to both materials and labor, and which accordingly is then susceptible of low prices of sale to the consuming public, thereby making such automotive testing tools economically available to the buying public.

Still yet another object of the present invention is to provide a new and improved automotive testing tool which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic top view of the instant invention.

FIG. 3 is an orthographic side view of the instant invention.

FIG. 4 is an isometric illustration of a modification of the invention.

FIG. 5 is an orthographic top view of the invention, as illustrated in FIG. 4.

FIG. 6 is an orthographic side view of the invention, as illustrated in FIG. 4.

FIG. 7 is an isometric illustration of the tool utilizing insert members.

FIG. 8 is an orthographic side view of the insert member utilized within each support loop of the invention.

FIG. 9 is an orthographic top view of the insert member.

FIG. 10 is an isometric illustration of the insert members in use.

DESCRIPTION OF THE PREFERRED EMBODIMENT

With reference now to the drawings, and in particular to FIGS. 1 to 10 thereof, a new and improved automotive testing tool embodying the principles and concepts of the present invention and generally designated by the reference numerals 10 and 10a will be described.

More specifically, the automotive testing tool 10 of the instant invention essentially comprises an elongate handle 11, including a handle rear gripping portion 12, to include spaced serpentine edges to accommodate enhanced manual grasping of the rear grasping portion 12. The handle 11 includes securement to a bifurcated mount 13, with the forward end of the handle received within spaced legs of the bifurcated mount 13 utilizing a mount axle 14 orthogonally directed through the bifurcated mount and the forward end of the handle 11 to pivotally mount a cylindrical lower receiving loop 15 at an upper terminal end of the bifurcated mount 13. The cylindrical lower receiving loop 15 receives a ball joint cup therewithin. An "L" shaped positioning leg 16 includes a first leg portion 17 orthogonally and fixedly mounted to a second leg portion 18. The first leg portion 17 includes a first leg slot 19 that is arranged generally parallel with the first leg portion 17 to define a slot to slidably receive the handle 11 therewithin. A handle axle 20 orthogonally directed into the first leg portion 17 through the first leg slot 19 pivotally mounts the handle relative to the first leg portion 17 and the "L" shaped positioning leg 16. Plural pairs of axle receiving bores 21, with each pair of bores coaxially aligned permitting disruption of the handle axle 20 therethrough in association with the handle 11, wherein as noted the handle axle 20 is orthogonally directed through the side walls of the handle, wherein repositioning of the axle 20 within one of the opposing axle receiving bores 21 permits adjustable spacing of the cylindrical lower receiving loop 15 relative to a cylindrical upper receiving loop 22. The upper loop 22 whose axis is parallel relative to the first leg portion 17 is fixedly mounted at a distal end of the second leg portion 18 spaced from the lower receiving loop 15. In this manner, the stud portion of an associated ball joint is directed through the upper loop 22, with the ball joint in position within an automotive "A" frame. Upon rotation of the handle 11 about the axle 20 available deflection of the lower loop 15 relative to the upper loop 22 is observed permitting an individual to ascertain a need for replacement or servicing of an associated ball joint to be tested.

The modified testing tool 10a, as illustrated in FIGS. 4–6, includes a semi-annular graduated scale plate 23 fixedly mounted to the handle 11, wherein the diameter of the semi-annular plate is orthogonally directed relative to the handle 11, wherein the diameter is defined by a length substantially equal to or less than that defined by a slot length defined by the slot 19 to permit reception of the scale plate 23 within the slot 19. An indicator needle 24 mounted to the first leg 17 indicates deflection of the graduated scale plate 23 relative to the needle to provide for a precise calculation of deflection in degrees of the needle relative to the scale plate.

The invention, as illustrated in the FIGS. 7–10, illustrate the use of insert members 26 that are received within the upper and lower loops 22 and 15 respectively. The insert members permit reception of a shock absorber "S" of a gas-filled type known in the prior art to permit visual observation of deflection and resistance of the gas shock absorber to ascertain available strength and if leakage has occurred of gas within the shock absorber. Each insert member includes a cylindrical magnetic head 27 complimentarily received within a respective upper and lower loop. The cylindrical magnetic head 27 includes an abutment ring flange 28 positioned below the magnetic heads 27 for abutment against the respective upper and lower loops 15 and 22, as illustrated in FIG. 10. parallel support legs 29 are orthogonally mounted to each magnetic head 27, wherein the parallel support legs 29 define a gap to receive the shock absorber "S" therebetween, in a manner as illustrated in FIG. 10. Should the shock absorber include mounting loops for securement of the shock absorber to such a mounting structure within an automotive environment, such a loop is arranged to receive the parallel support legs 29 for securement of the shock absorber to the organization.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the U.S. is as follows:

1. An automotive testing tool, comprising,
    an elongate longitudinally aligned handle, wherein the handle includes a rear grasping portion and a forward end portion, a cylindrical lower receiving loop pivotally mounted to the forward end portion, including a mount axle pivotally mounting the receiving loop relative to the forward end portion of the handle, an "L" shaped positioning leg, the "L" shaped positioning leg including a first leg portion fixedly and orthogonally mounted to a second leg portion, the first leg portion including a first leg slot defined by a predetermined length, wherein the first leg slot extends from a lower terminal end of the first leg portion and receives the elongate handle at a position between the mounting loop and the rear grasping portion, a handle axle orthogonally directed through the first leg portion, through the first leg slot and through the handle to pivotally mount the handle within the first leg slot, and the second leg portion includes an upper cylindrical receiving loop defined by an axis, wherein the axis is oriented parallel relative to the first leg portion.

2. A tool as set forth in claim 1 wherein the lower receiving loop includes a bifurcated mount, the bifurcated mount receiving the forward end portion of the elongate handle therewithin, with the mount axle directed through the bifurcated mount.

3. A tool as set forth in claim 2 including a semi-annular graduated scale plate fixedly mounted to the elongate handle adjacent the handle axle, wherein the scale plate defined a scale plate diameter orthogonally oriented relative to the elongate handle, and wherein the diameter is defined by a diameter length substantially equal to or less than the predetermined length of the first leg slot, and an indicator needle fixedly mounted to the first leg portion medially of the scale plate arranged to indicate arcuate deflection of the handle relative to the first leg portion.

4. A tool as set forth in claim 3 wherein the lower receiving loop and the upper receiving loop each include an insert member receivable therewithin, each loop is formed of a ferrous metallic material, and each insert member includes a cylindrical magnetic head, wherein each cylindrical magnetic head complimentarily received within the loop of said upper receiving loop and said lower receiving loop, and each cylindrical magnetic head includes an abutment ring flange circumferentially and fixedly mounted about the magnetic head spaced below a top surface of the magnetic head for abutment of each said loop, and each insert member includes a plurality of parallel support legs orthogonally and fixedly mounted relative to each magnetic head, wherein each plurality of parallel support legs defines a gap therebetween, wherein the insert members are arranged to receive a shock absorber therebetween permitting pivotment of the handle relative to the "L" shaped positioning leg for measuring available deflection, and predetermined resistance upon pivotment of the elongate handle relative to the "L" shaped positioning leg.

* * * * *